United States Patent [19]

Demay et al.

[11] Patent Number: 5,108,657
[45] Date of Patent: Apr. 28, 1992

[54] STRIPPABLE, SILANE-CURABLE, SEMICONDUCTING MIXTURE, IN PARTICULAR FOR ELECTRICAL CABLES, AND A METHOD OF IMPLEMENTING SAID MIXTURE

[75] Inventors: Jean-Noël Demay, Vernaison; Philippe Mercier, Caluire, both of France

[73] Assignee: Les Cables de Lyon, Clichy, France

[21] Appl. No.: 416,485

[22] Filed: Oct. 3, 1989

[30] Foreign Application Priority Data

Oct. 13, 1988 [FR] France .................. 88 13477

[51] Int. Cl.⁵ .............................. H01B 1/06
[52] U.S. Cl. ................... 252/511; 524/495; 524/496; 524/504
[58] Field of Search ............. 252/511, 510; 524/495, 524/496, 487, 488, 489, 500, 504, 588, 480; 174/105 SC, 120 SC

[56] References Cited

U.S. PATENT DOCUMENTS 4,226,823 10/1980 Jannon .................. 174/120 SC

Primary Examiner—Josephine Barr
Attorney, Agent, or Firm—Kenyon & Kenyon

[57] ABSTRACT

A semiconducting mixture which is curable with the aid of silanes includs the following parts by weight:

a) 70 to 80 parts of a first copolymer of ethylene, or of ethylene and another olefin, with an ester taken from the group constituted by ethyl acrylate, vinyl acetate, and butyl acetate, with only a fraction lying in the range 60% to 75% of the copolymer being grafted with the aid of silanes;

b) 30 to 40 parts of a second copolymer of acrylonitrile and butadiene having about 40% by weight of acrylonitrile;

c) 40 to 60 parts of conducting carbon black of the quality satisfying the standard ASTM D 2515-68;

d) 15 to 20 parts of monocrystaline wax; and e) 1 part of a phenolic antioxidant.

A method of manufacturing a cable having a strippable semiconducting layer constituted by the above mixture includes extruding a first polymeric insulating layer onto an electrically conductive cable, extruding a second semiconducting layer of the above mixture around the first insulating layer, and then simulatenously curing both extruded layers.

4 Claims, No Drawings

STRIPPABLE, SILANE-CURABLE, SEMICONDUCTING MIXTURE, IN PARTICULAR FOR ELECTRICAL CABLES, AND A METHOD OF IMPLEMENTING SAID MIXTURE

The present invention relates to a strippable semiconducting mixture, in particular for electrical cables, the mixture being curable with the aid of silanes and containing both carbon black and a phenolic antioxidant agent. The invention also relates to a method of implementing the mixture.

The mixture is curable at moderate temperature in the presence of water of water vapor, and in the cured state it has the characteristic of adhering under defined conditions to an underlying insulating layer constituted by polyethylene or possibly by a copolymer of ethylene and another olefin, with said layer itself being cured by any appropriate method or being suitable for curing at moderate temperature in the presence of water or water vapor.

BACKGROUND OF THE INVENTION

In the manufacture of certain electrical cables, in particular medium or high tension cables, it is desirable to cover the cured insulating layer with a semiconducting layer of cured thermoplastic material that is easily detachable from the insulating layer. This requirement means that the adhesion between the two layers should be low. However, the adhesion should not be so low as to lead to the two layers coming unstuck when the cable is subjected to various stresses in use.

This particular characteristic is referred to by the term "strippability". It is generally defined by a value or a range of values which, under defined operating conditions, cause the two layers to separate.

For example, in France, Standard HN 33-S-23 published by ELECTRICITE DE FRANCE in November 1981 provides for a stripping test applied to a strip of semiconducting layer which is 10 mm wide and cut parallel to its generator lines. After one end of this strip has been lifted over a portion of its length and folded right back over itself, the remainder of the strip should become detached from the insulating layer when the axially-applied traction force lies in the range 5 newtons (N) to 25N, at a temperature lying in the range of 0° C. to 40° C. Similar tests exist in other countries.

A property which is defined so precisely cannot be obtained merely by using any semiconducting mixture, such as that which would result, for example, from incorporating conductive carbon black in a curable mixture of the underlying insulation.

In addition, it is clearing desirable for the assembly constituted by the insulating layer and the semiconducting layer to be capable of being cured in a single operation, which implies that both of them should require the same curing process. Thus, insulating and semiconducting mixtures are known which are capable of being cured chemically by means of peroxides. However this method requires equipment which is bulky and expensive. Further, it is not technically very satisfactory since it can facilitate the creation of water arborescence in the insulating layer which is highly prejudicial to the lifetime of the cable.

SUMMARY OF THE INVENTION

The object of the present invention is to provide a semiconducting mixture which can be grafted by means of silanes, and which can therefore be cured at moderate temperature in the presence of water or water vapor, using the technique described in British patent GB-A-1 286 460, which technique is known under the commercial name SIOPLAS, and in a variant under the name MONOSIL, and is capable of being applied during a given manufacturing operation to a layer which has already been cured either by using the same method or else by using a different method, e.g. chemical curing by means of peroxide, or curing by means of irradiation.

Another object of the invention is to provide a mixture which does not require bulky and expensive equipment for applying it to an underlying insulating layer, and which avoids any danger of water arborescence appearing in the insulating layer. A final object of the invention is to make it possible to cure the mixture simultaneously with the underlying insulating layer.

The mixture of the invention comprises:

a) 70 to 80 parts of a copolymer of ethylene, or of ethylene and another olefin, with an ester taken from the group constituted by ethyl acrylate, vinyl acetate, and butyl acetate, with only a fraction lying in the range 60% to 75% of the copolymer being grafted with the aid of silanes;

b) 30 to 40 parts of a copolymer of acrylonitrile and butadiene having about 40% by weight of acrylonitrile;

c) 40 to 60 parts by weight of conducting carbon black of the quality satisfying the standard ASTM D 2515-68;

d) 15 to 20 parts of monocrystalline wax; and e) 1 part of a phenolic antioxidant.

DETAILED DESCRIPTION

The grafting of olefin polymers is described in U.S. Pat. No. 3,075,948.

The rate at which the mixture is cured depends on the thickness of the layer to be cured and on whether or not a certain quantity of curing catalyst is present in the extruded mixture.

In general, there is no need to add a curing catalyst so long as the mixture is cured at the same time as the underlying insulating layer, with said underlying layer itself being designed to be cured using the SIOPLAS or MONOSIL techniques described in British patent GB-A-1 286 460. In this case, the catalyst contained in the insulating layer suffices for ensuring that the semiconductor layer is cured under the same hygrometric and temperature conditions.

Otherwise, a catalyst may be added in conventional manner, e.g. tin dibutyl dilaurate, at 1% by weight relative to the weight of the copolymer of ethylene and ester.

It is not recommended to add the catalyst directly to the mixture since that could result in the material curing partially prior to being used. It is preferable to make up a master mixture incorporating the catalyst in a fraction of the 20 to 30 parts of non-grafted copolymer. This master mixture is then inserted via a screw pump, e.g. into the hopper of the extruder, at the same time as the mixture. The choice between the three esters in the copolymer of ethylene and ester usable in accordance with the invention is made as a function of the other properties, in particular the physical properties, which the mixture is to satisfy, either prior to curing, or after curing. For example, a mixture made with a copolymer of ethylene and 18% by weight vinyl acetate is advantageous when it is desired to hot cure a certain length of cable wound on a drum or wound down in a tank in a special operation, since in this case no adhesion is observed between turns even if the cable is wound and cured at a temperature of 70° C.

The mixture as described allows for the proportions of its ingredients being varied, in particular so that the semiconducting layer can satisfy, exactly, the conditions laid down by the standard which the cable is required to meet. Thus, it has been shown during prior testing that adhesion diminishes with a reduction in the quantity of the copolymer of butadiene and acrylonitrile, and the quantity of ethylene copolymer is increased by a corresponding amount, or the quantity of the grafted copolymer is reduced while the quantity of the non-grafted copolymer is increased accordingly. This latter modification in the composition also has an effect on the flexibility of the cured product, which is increased thereby.

With reference to standard EDF HN 33-S-23, an entirely satisfactory mixture is constituted by the following precise formulation;

50 parts grafted ELVAX 460;
25 parts non-grafted ELVAX 460;
with these two products based on a copolymer of ethylene and vinyl acetate being sold by DU PONT DE NEMOURS;
25 parts KRYNAC 40-50 sold by POLYSTAR;
50 parts XC 72 carbon black sold by CABOT;
17 parts MF white ceresin sold by LA CERESINE; and
1 part IRGANOX 1076 sold by CIBA.

Although not specified explicitly, this mixture does contain a curing catalyst, namely the catalyst contained in the non-grafted ELVAX 460 material.

This mixture is extruded, e.g. over an insulating layer which is curable but not yet cured, and obtained from curable mixture 409 sold by AEI. The assembly is then cured over several days at ambient temperature and humidity, or over several hours if plunged into a tank filled with water or water vapor at a temperature of 70° C. The stripping force measured in accordance with the EDF standard is 20N at 0° C., 22N at 20° C., and 17N at 40° C. However, these remarkable results can be obtained only by satisfying the following extrusion conditions when extruding the semiconducting mixture:

The temperature of the head and the extrusion die should lie in the range 180° C. to 190° C.;

Prior to receiving the semiconducting layer, the insulating layer must be dried, and its surface temperature must be kept constant in the range 50° C. to 60° C. with any increase in this temperature rapidly increasing adhesion; and It is necessary for the mandrel-die assembly to apply a degree of compression to the material at the point of extrusion on the insulating layer. This can be obtained by a judicious selection of the profile of the tooling and an appropriate adjustment of the distance between the end of the mandrel and the end of the die as a function of the composition of the mixture and the profile of the tooling.

We claim:

1. A strippable semiconducting mixture for use as an overcoating on insulated electrical cables, the mixture comprising the following in parts by weight:
   a) 70 to 80 parts of a first copolymer of a material selected from the group consisting of ethylene and of ethylene and another olefin, with an ester selected from the group consisting of ethyl acetate, vinyl acetate, and butyl acetate, with 60% to 75% of the first copolymer being grafted with the aid of silanes and the remainder of the first copolymer being ungrafted;
   b) 30 to 40 parts of a second copolymer of acrylonitrile and butadiene having about 40% by weight of acrylonitrile;
   c) 40 to 60 parts of conducting carbon black of a quality satisfying the standard ASTM D 2515-68;
   d) 15 to 20 parts of monocrystalline wax; and
   e) 1 part of a phenolic antioxidant.

2. A mixture according to claim 1, further including a curing catalyst, the catalyst being previously incorporated in a master mixture comprising at least a portion of the non-grafted remainder of the first copolymer.

3. A mixture according to claim 2, wherein the curing catalyst is tin butyl dilaurate at a concentration of about 1% by weight relative to the first copolymer.

4. A mixture according to claim 1, wherein the ester of the first copolymer is vinyl acetate at a concentration of 18% by weight relative to the total weight of the first copolymer.

* * * * *

UNITED STATES PATENT AND TRADEMARK OFFICE
CERTIFICATE OF CORRECTION

PATENT NO. : 5,108,657
DATED     : April 28, 1992
INVENTOR(S) : Jean-Noel Demay, et al.

It is certified that error appears in the above-identified patent and that said Letters Patent is hereby corrected as shown below:

On the Title Page, Abstract, line 2: "includs" should be --includes--.

Column 1, line 14: "of", second occurrence, should be --or--.

Column 1, line 53: "clearing" should be --clearly--.

Signed and Sealed this

Thirty-first Day of August, 1993

Attest:

BRUCE LEHMAN

Attesting Officer

Commissioner of Patents and Trademarks